Oct. 10, 1950      L. F. SOSDIAN      2,525,186
TRAMMEL BAR
Filed Aug. 21, 1944      2 Sheets-Sheet 1
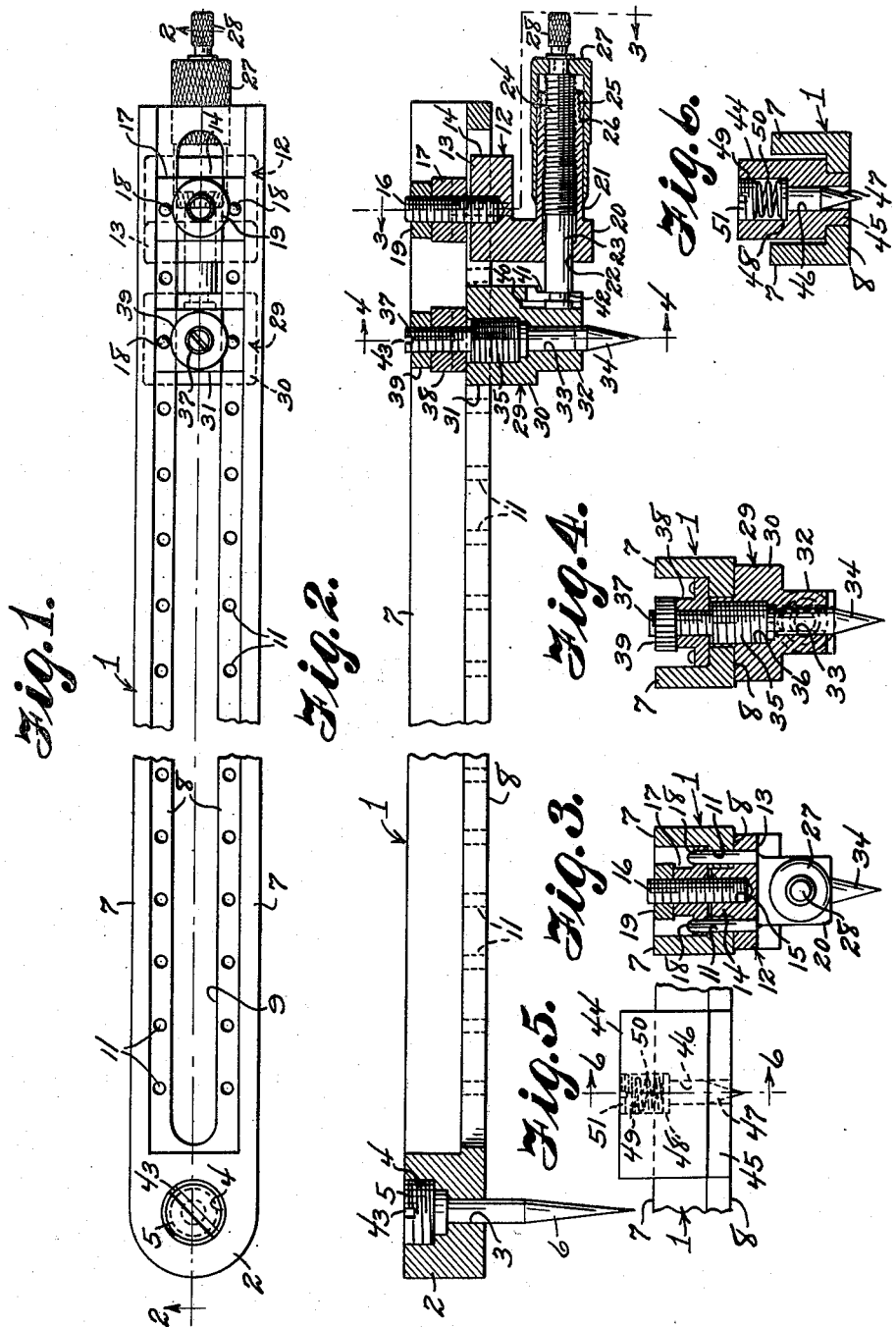
INVENTOR.
Lorenz F. Sosdian
BY
Victor J. Evans & Co.
ATTORNEYS

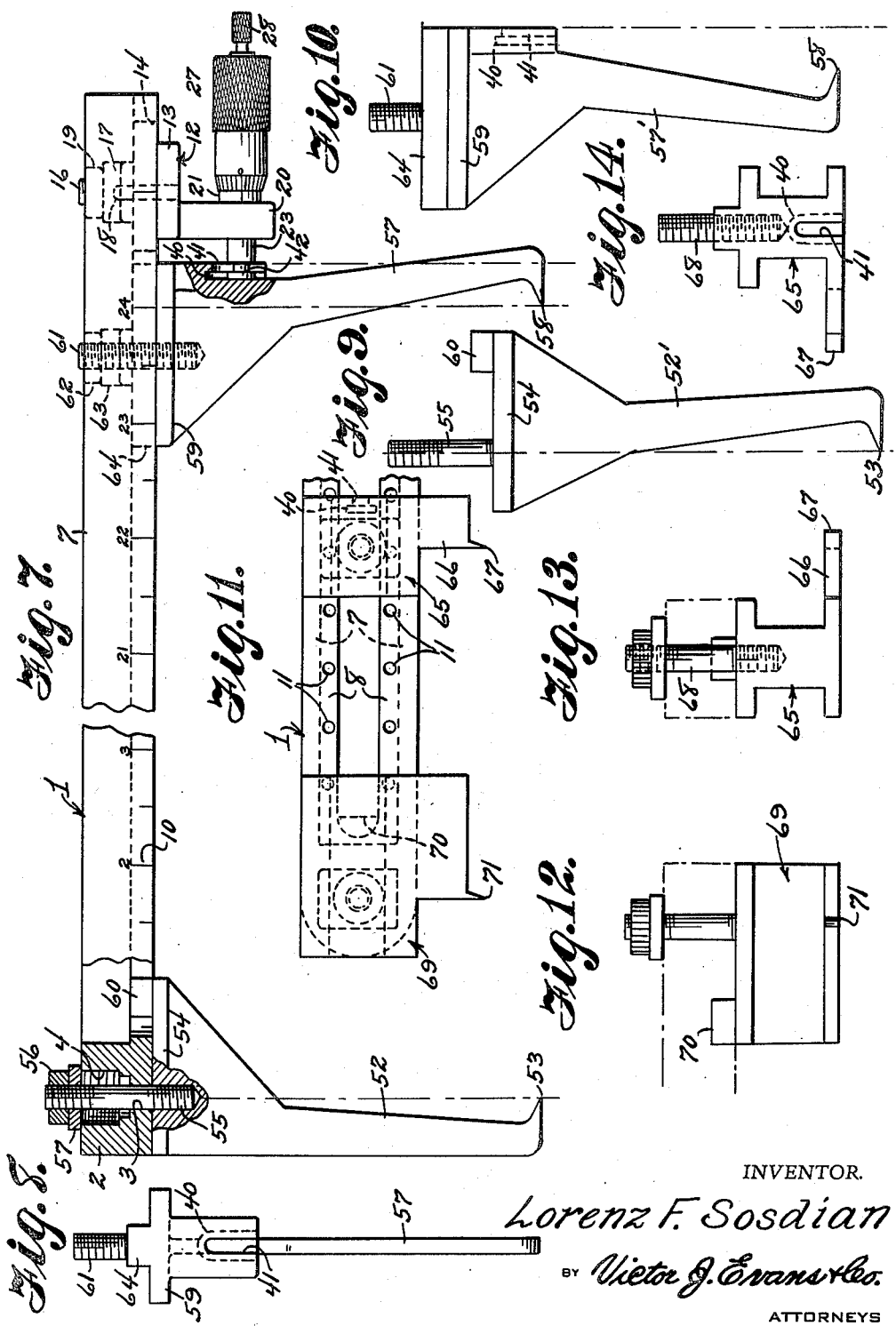

Patented Oct. 10, 1950

2,525,186

UNITED STATES PATENT OFFICE 2,525,186

TRAMMEL BAR

Lorenz Florian Sosdian, New Orleans, La.

Application August 21, 1944, Serial No. 550,413

1 Claim. (Cl. 33—159)

My present invention, in its broad aspect, relates to improvements in precision instruments, and more particularly to improvements in combination inside and outside calipers, centering and scribing means, trammel bar, and straight edge; the instrument carrying as a unit thereof a micrometer adjustment.

In accomplishing the many important objects and advantages of my invention, I provide a trammel bar having a straight edge and a center slot with opposed pairs of anchoring holes at predetermined accurately measured intervals on a scale displayed by the bar for receiving anchoring pins of a primarily adjustable micrometer block for cooperation with a sliding block to affect secondary precision adjustments. The secondary sliding block carrying a scribing or measuring point or either an inside or outside caliper arm to cooperate with a fixed block carrying a centering point or a cooperating inside or outside caliper arm. My device contemplates a trammel bar which is substantially U-shaped in cross section and has a center slot, and which has straight edges, a scale and spaced anchoring openings at intervals on the scale. The fixed centering point, or an inside or outside caliper arm is carried at one end of the trammel bar, and measurements on the scale are read from the fixed point or caliper arm as a datum. The initial or primary adjustment is affected by a sliding block having anchoring pins fitting in the openings to hold the block in its initially adjusted position. This block carries a sliding connection to a slidable block, which sliding connection has micrometer adjustment to affect a secondary and precision setting of the sliding block in accordance with the vernier scale. The sliding or precision adjustment block carries the scribing or measuring point, or the opposed and cooperating inside or outside caliper arm. For precision measurements in association with the scale and at the side of the trammel bar I provide modified blocks with readily discernible and readable points.

Among the major objects and advantages of my above broadly defined construction, are (1) the provision of a very simple, sturdy and accurate precision instrument which is designed for hard and continuous service: (2) the provision of means whereby my device can be used for a number of purposes as for instance in making precision measurements, centering, scribing, as either inside or outside calipers, or use as a straight edge: (3) the provision of means for making quick initial adjustments upon which micrometer adjustments may be based thereby saving time, and (4) the provision of unique, improved and accurate adjusting means to the end that a practical and adaptable instrument is provided for use in any situation where precision work is indicated.

Other and equally important objects and advantages will be apparent from the following detailed description and accompanying drawings but change may be made in form, size, shape, arrangement and construction of parts provided same fall within the purview of my broad inventive concept and the appended claim.

In the drawings wherein I have illustrated a preferred form of my invention and some slight modifications:

Figure 1 is a top plan view of my device;

Figure 2 is a longitudinal section taken on the line 2—2 of Figure 1 and shows its use with centering and scribing points;

Figure 3 is a transverse section through the slidable anchor block on the line 3—3 of Figure 2;

Figure 4 is a transverse section through the slidable precision adjustment block on the line 4—4 of Figure 2;

Figure 5 is a modified form of sliding block carrying a spring pressed point for scribing a straight line by drawing same along the slot in the trammel bar;

Figure 6 is a transverse section through the scribing block shown in Figure 5 and is taken on the line 6—6 of Figure 5;

Figure 7 is a side elevation, partly in section of my device used as outside calipers;

Figure 8 is a detailed end view of the sliding precision block and outside caliper arm of the form shown in Figure 7;

Figure 9 is a detailed side view of the sliding precision block shown in Figure 8;

Figure 10 is a detailed side view of the sliding block as fitted with an inside caliper arm;

Figure 11 is a view of modified forms of fixed and sliding blocks on a fragmentary top plan view of the trammel bar for making measurements;

Figure 12 is a detailed view of the fixed block used in the form shown in Figure 11;

Figure 13 is a side view of the fixed block for attaching inside or outside caliper points, and Figure 14 is a side view of the sliding block for attaching inside or outside caliper points.

In the drawings wherein like characters of reference are used to designate like or similar parts throughout the several views:

The numeral 1 designates my trammel bar which is of any suitable length and has a rounded head end 2 formed with a center opening 3 having a threaded enlarged bore 4 to receive the threaded head 5 of a centering pin 6. The bar is U-shaped in cross section throughout the remainder of its length providing spaced parallel sides 7 and a bottom 8 which is slotted as at 9 from the head end 2 to a point adjacent the remaining end of the bar. The bar 2 has a scale 10—see Figure 7—on one side, and pairs of transversely aligned openings 11 at either side of slot 9 in the bottom 8 disposed at fixed measured intervals along the length of the bar from the head 2. The bar 1 has straight edges and may be used for either ruling or measuring, as well as a support for the scribing, calipering and precision measuring parts hereinafter described.

A block 12 having a base 13 slidably mounted against the under side of the bottom 8 of bar 1 has an upstanding lug 14 seated in slot 9. Threaded into a bore 15 is the shank of a screw threaded bolt 16 on which is mounted a clamping head 17 having spaced aligned, opposed openings 11, which are adapted to receive the spaced pins 18 carried by the block 12. The clamping head slides on the top of bottom 8, and a nut 19 on bolt 16 holds the head in clamping engagement with the bottom 8 to hold the block 12 in place on the bar. Formed on, and depending from one end of the block 12 is a part 20 having a lateral internally threaded tubular extension 21 communicating with a bore 22 in part 20 through which extends the micrometer shaft 23 which is threaded as at 24, to engage the internal threads of extension 21. Extension 21 is reduced at 25 to engage the shoulder 26 of the tube-like cap 27. Through the end of cap 27 is a knurled finger stud 28 which is fixed to the end of shaft 23 and keyed to caps 27 whereby the cap and shaft are rotated to affect a vernier reading of the movement of shaft 23 in extension 21. As previously stated the block is slidable on the bar, and pins 18 engage in openings 11 to fix the position of the block 12 on the bar for general adjustment within certain broad limits designated by the graduation of scale 10.

A slidable block 29 has a body part 30 engaging the bottom 8 of bar 1 and a head 31 fitting against the bottom 8 above and to each side of slot 9. The body is formed with a depending part 32, and a bore 33 extends through body 30 and part 32 to receive a pointed pin 34 (similar and cooperating with centering pin 6) which has an enlarged threaded head 35 engaging the threads in an enlarged part 36 of bore 33, and which extends up through slot 9—see Figure 4. A threaded extension 37 on head 35 passes through an opening in clamping head 38 and carries a nut 39 so that the block 29 may be either tensioned or clamped by the head 38 in adjusted position on the bar 1.

The depending part 32 has a slot 40 extending upwardly and opening through the base which is flanged as at 41 so that the groove 42 adjacent the end of shaft 23 receives the flanges 41 to lock the end of the shaft 23 to the block 29.

By these means micrometer adjustment of shaft 23 gives a precision adjustment to block 29 to accurately center the pin 34 with reference to pin 6, thereby enabling the operator to scribe accurate circles using pin 6 as a center, and pin 34 as a scriber, or to take accurate measurements. It will be noted that extension 37 has a screwdriver kerf 43 as well as the head 5.

Adapted for sliding movement in slot 9 of bar 1 is a block 44 having a body which fits between the sides 7 and a depending part 45 which fits into the slot. A bore 46 carries a pointed pin 47 to scratch or scribe a straight line by moving the block along the bar, and pin 47 has a head 48 which is seated on an internally threaded enlargement 49 of bore 46 and is pressed by spring 50. Spring 50 is held seated by a threaded cap 51 adjustably held in the enlargement 49 of bore 46—see Figures 5 and 6.

My invention is adapted for use as either inside or outside calipers by mounting caliper arms on the blocks. As shown in Figure 7 a fixed outside caliper arm 52 having a point 53 and base 54 engaging the under side of bar 1, carries a threaded pin 55 through center opening 3 in end 2 of bar 1. A nut 56 and clamping washer 57 holds the fixed caliper arm in place. By reversing the point 53 of arm 52 an inside caliper arm may be provided. For the other outside caliper arm I substitute in place of block 29 an outside slidable caliper arm 57 having a point 58 having a base 59 and a stud 60 slidable in slot 9. A threaded bolt 61 carrying a nut 62 and clamping head 63 mounts the arm on bar 1. Connection with micrometer shaft 23 is through slot 40, flanged at 41 to engage in groove 42 so that precision micrometer adjustment of shaft 23 gives precision micrometer adjustment to slidable outside caliper arm 57. By reversing the arm 57—as shown in Figure 10—the same is adapted for inside caliper measurements. Furthermore the stud 60 may be extended as at 64 in Figure 10 to form an extensive bearing in the bar.

To make accurate measurements laterally of the bar 1 I provide a slidable block 65 with a lateral extension 66 having a point 67 at its edge and an attaching bolt 68 see Figure 13. A fixed block 69 has a lug 70 fitting in slot 9 and a point 71. The generally adjustable block 65—see Figure 14—has a clamping bolt 68 and the slot and flanged connection 40 and 41 with the micrometer shaft 23. The points 67 and 71 constitute the centers for measurement. The centers to the caliper points 58 and 53 through bolts 61 and 55 are indicated by dot-and-dash lines in Figures 7–9 and 10.

It is believed that the operation and advantages of my invention will be apparent from the foregoing, but it is again emphasized that interpretation of its scope should only be conclusive when made in the light of the subjoined claim.

I claim:

In a carrier for measuring, centering, scribing and inside and outside caliper members having an elongated substantially U-shaped trammel bar provided with an elongated slot in the bottom thereof and a fixed element at one end thereof having a body and an attaching portion, the improvement comprising an L-shaped element having a base portion and a second portion extending from one end of the base portion at right angles thereto slidable on the bar, a clamping head mounted on the base portion of said element, and an upstanding lug on the base portion of said element extending into said slot, a tubular extension on said second portion, a shaft mounted in the tubular extension of said second portion, a micrometer adjustment for said shaft, means carried by said element for retaining said element in fixed adjusted position on said bar, and said means comprising pins carried by said element and receivable in relatively spaced openings in said bar and said clamping head, a second sliding element mounted on the bar and said shaft having a rotary connection with said second element, means carried by said second element of similar construction to the means for retaining said first element in fixed relation to said bar, a marking member carried by said second element and the micrometer adjustment adapted to adjust the relation of said marking member to said fixed element whereby accurate measurements may be made.

LORENZ FLORIAN SOSDIAN.

REFERENCES CITED

The following references are of record in the file of this patent:

UNITED STATES PATENTS

| Number | Name | Date |
|---|---|---|
| 285,684 | Sauter | Sept. 25, 1883 |
| 314,316 | Christian | Mar. 24, 1885 |
| 384,771 | MacDonald | June 19, 1888 |
| 595,524 | Clough | Dec. 14, 1897 |
| 761,328 | Spalding | May 31, 1904 |
| 985,978 | Coxhead | Mar. 7, 1911 |
| 1,031,354 | Machava | July 2, 1912 |
| 1,402,629 | Manly | Jan. 3, 1922 |